United States Patent
Suzuki et al.

(10) Patent No.: US 7,771,068 B2
(45) Date of Patent: Aug. 10, 2010

(54) LIGHT REFLECTION PLATE

(75) Inventors: Osamu Suzuki, Tokyo (JP); Nobuyuki Morita, Tokyo (JP); Kaoru Sekiguchi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 224 days.

(21) Appl. No.: 12/065,526

(22) PCT Filed: Aug. 31, 2006

(86) PCT No.: PCT/JP2006/317171

§ 371 (c)(1), (2), (4) Date: Jun. 18, 2008

(87) PCT Pub. No.: WO2007/026795

PCT Pub. Date: Mar. 8, 2007

(65) Prior Publication Data

US 2009/0195880 A1     Aug. 6, 2009

(30) Foreign Application Priority Data

Sep. 2, 2005 (JP) .............................. 2005-255317
Dec. 12, 2005 (JP) .............................. 2005-357614

(51) Int. Cl.
*G02B 7/182* (2006.01)

(52) U.S. Cl. .................................... 359/855; 359/850
(58) Field of Classification Search ................ 359/838, 359/850, 855, 871, 883
See application file for complete search history.

(56) References Cited

U.S. PATENT DOCUMENTS 5,220,462 A * 6/1993 Feldman, Jr. ................ 359/855

FOREIGN PATENT DOCUMENTS

JP    2004 47151    2/2004
JP    2004 138715   5/2004

* cited by examiner

*Primary Examiner*—William C Choi
(74) *Attorney, Agent, or Firm*—Oblon, Spivak, McClelland, Maier & Neustadt, L.L.P.

(57) ABSTRACT

A three-dimensional light reflection plate that can successfully prevent deformation of the light reflection plate, reduce initial cost and product cost, and facilitate increase in size and reflectance. The light reflection plate includes a bottom plate in which a plurality of mutually parallel slit holes are formed on a flat, light-reflective plate material and a mountain plate that is rectangular from a planar view of which a width direction cross-sectional shape is a mountain shape and in which insertion sections are formed in both width-direction end sections. The mountain plate is fixed to the bottom plate by the insertion sections of the mountain plate being inserted into the slit holes of the bottom plate.

12 Claims, 5 Drawing Sheets

LIGHT REFLECTION PLATE

TECHNICAL FIELD

The present invention relates to a light reflection plate used in, for example, a liquid crystal display device, an illuminated signboard, and a lighting apparatus.

BACKGROUND ART

Conventionally, as a light reflection plate used in a liquid crystal display device, an illuminated signboard, a lighting apparatus, and the like, a three-dimensional light reflection plate made from synthetic resin is proposed. As such light reflection plates, for example, there are those described hereafter in (1) to (3):

(1) a light reflection plate in which a linear bending line that is a perforated line, a pressed ruled line, a half-cut, or the like is formed on a foamed plastic film or sheet that reflects light, and a mountain-shaped section is formed by the film or sheet being bent along the bending line (refer to, for example, Patent Literature 1);

(2) a light reflection plate in which a reflection sheet made from synthetic resin is adhered onto a thin metal plate and a mountain-shaped section is formed by the metal plate being pressed by a mold;

(3) a light reflection plate in which a mountain-shaped section is formed by injection-molding using a mold.

Patent Literature 1: Japanese Patent Laid-open Publication No. 2004-138715

DISCLOSURE OF INVENTION

Problem to be Solved by the Invention

However, the above-described light reflection plates in (1) to (3) have problems such as the following. In other words, in the light reflection plate in (1), deformation occurs after manufacturing as a result of strain during formation or spring-back after formation. Therefore, as a means to prevent the deformation of the light reflection plate, an adhesive tape for shape-retention is taped onto the light reflection plate. However, even when this means is used, the overall light reflection plate may become warped because a bending angle at the foot of the mountain-shaped section cannot be maintained due to a restitutive force of the light reflection plate and the bending angle at the foot of the mountain-shaped section widens. In the light reflection plate in (1), the film or sheet used to manufacture the light reflection plate is larger than that of a flat light reflection plate because the mountain-shaped section is formed. In accompaniment with the increase in size of the film or sheet such as this, difficulty in manufacturing the film or sheet increases. Therefore, size increase of the light reflection plate is difficult to achieve.

In the light reflection plate in (2), a mold is required to be made for each product size and each shape of the mountain-shaped section, thereby increasing initial equipment cost.

In the light reflection plate in (3), a mold is required to be made for each product size and each shape of the mountain-shaped section, thereby increasing initial equipment cost. In addition, because the light reflection plate is manufactured by injection-molding of synthetic resin, light reflectance decreases compared to a light reflection plate formed by processing a pre-manufactured reflection sheet.

The present invention has been achieved in light of the problems above. An object of the present invention is to provide a three-dimensional light reflection plate that can successfully prevent deformation of the light reflection plate, reduce initial cost and product cost, and facilitate increase in size and reflectance.

Means for Solving Problem

To achieve the above-described object, the present invention provides a light reflection plate including a bottom plate and a mountain plate that is roughly rectangular from a planar view. In the bottom plate, slit holes are formed on a flat, light-reflective plate material. The mountain plate is made from a light-reflective plate material. In the mountain plate, a width direction cross-sectional shape is formed into a mountain shape and insertion sections are provided in both width-direction end sections. The mountain plate is fixed to the bottom plate by the insertion sections of the mountain plate being inserted into the slit holes in the bottom plate.

In the light reflection plate of the present invention, the mountain plate is fixed to the bottom plate by the insertion sections of the mountain plate being inserted into the slit holes in the bottom plate. Therefore, bending at the foot of the mountain-shaped section is not required. The shape of the mountain plate is retained by the slit holes in the bottom plate. An apex angle of the mountain-shaped section can be prevented from changing. Therefore, in the light reflection plate of the present invention, shape retention properties are significantly improved and deformation can be prevented with certainty.

When the light reflection plate of the present invention is manufactured, a mold is not required to be made for each product size and each shape of the mountain-shape section. Therefore, the initial equipment cost and product cost is reduced. Furthermore, the light reflection plate of the present invention is divided into the bottom plate and the mountain plate. Therefore, a size of the plate material required to manufacture the light reflection plate is equal to that of a flat reflection plate. As a result, size increase of the light reflection plate can be facilitated.

The present invention will be hereinafter described in further detail. In the present invention, the plate material forming the bottom plate and the plate material forming the mountain plate are not necessarily limited. However, the plate material is preferably made from a light-reflective plastic film or sheet, or a laminated body including a light-reflective plastic film or sheet and a metal plate. In this case, for example, general-purpose resins such as polyethylene, polypropylene, polystyrene, polyvinylchloride, polybiphenylchloride, polyethylene terephthalate and polyvinyl alcohol, engineering plastics such as polycarbonate, polybuthylene terephthalate, polyethylene naphthalate, polyamide, polyacetal, polyphenylene ether, ultra-high molecular weight polyethylene, polysulfone, polyethersulfone, polyphenylenesulfide, polyarlate, polyamideimide, polyetherimide, polyetheretherketone, polyimide, polytetrafluoroethylene, liquid crystal polymer and fluororesin, or copolymers and mixtures thereof are given as materials for the light-reflective plastic film or sheet. Among these, due to superior heat-resistance and impact-resistance properties and the like, a film or sheet made from polyethylene terephthalate, polyphenylenesulfide, polypropylene, or cyclopolyolefin is preferable. The same material can be used as the plastic film or sheet for the bottom plate and the mountain plate. Alternatively, different materials can be used.

More specifically, a preferred example of the light-reflective plastic film or sheet is a thermoplastic film or sheet having fine bubbles or pores with a mean bubble diameter of 50 nanometers to 50 micrometers. A foamed plastic light reflection sheet having an internal bubble diameter of 50 micrometers or less (for example, MCPET [registered trademark] manufactured by Furukawa Electric Co., Ltd.) is an example of a film or sheet such as this. The sheet is a polyethylene terephthalate extrusion sheet heated and foamed after being impregnated with carbon dioxide gas under high pressure.

Another preferred example of the light-reflective plastic film or sheet is a thermoplastic film or sheet containing fillers in which numerous voids are formed with the fillers serving as cores. In this case, the thermoplastic film or sheet containing fillers is preferably a porous stretched film or sheet in which numerous voids are formed with the fillers serving as the cores by forming an un-stretched film or sheet containing fillers and stretching this un-stretched film or sheet.

Additives, such as antioxidant, ultraviolet inhibitor, lubricant, pigment, reinforcement, and the like can be added accordingly to the resin used in the light-reflective plastic film or sheet. In addition, a coating layer containing these additives can be formed on the plastic film or sheet.

In the present invention, a formation method of the mountain plate is not limited. The mountain plate can be formed by, for example, press-molding, folding, and the like. The width direction cross-sectional shape of the mountain plate can be formed into a mountain-shape that is, for example, triangular, semi-polygonal, semicircular, or semi-elliptical, but is not limited thereto.

In the present invention, as described according to embodiments below, a concave-convex linear cut section and a joined section can be alternately formed in a peak section of the mountain plate. In other words, when a bending line that is a perforated line, a pressed ruled line, a half-cut, or the like is formed along an entire length of the peak section of the mountain plate, the restitutive force of the mountain plate increases. Therefore, to retain the shape of the mountain plate with certainty, a pitch of the slit holes in the bottom plate is required to be short and a large number of slit holes are required to be provided in the bottom plate. At the same time, when a linear cut section and joined section are alternately formed in the peak section of the mountain plate to reduce the restitutive force of the mountain plate, the linear cut sections may open, forming gaps in the peak section of the mountain plate. On the other hand, when the concave-convex linear cut section and the joined section are alternately formed in the peak section of the mountain plate, the restitutive force of the mountain plate can be reduced without the gaps being formed in the peak section of the mountain plate. As a result, the pitch of the slit holes in the bottom plate can be lengthened and the number of slit holes provided in the bottom plate can be reduced. As a result, workability can be enhanced and manufacturing cost can be reduced.

In this case, a length ratio of a single concave-convex linear cut section and a single joined section is preferably 10 to 2:1. A linear bending line that is a perforated line, a pressed ruled line, a half-cut, or the like is preferably formed in the joined section.

In the present invention, a slit width of the slit hole in the bottom plate is preferably three times the thickness of the insertion section of the mountain plate or less.

In the present invention, a plurality of slit holes are intermittently formed in the bottom plate along a straight line. A length of a single slit hole is suitably 50 millimeters or less. A distance between two slit holes adjacent along the straight line is suitably 30 millimeters or less. However, when the concave-convex linear cut section and the joined section are alternately formed in the peak section of the mountain plate, as described above, the number of slit holes can be reduced.

Effect of the Invention

In the light reflection plate of the present invention, deformation of the light reflection plate can be successfully prevented, initial cost and product cost can be reduced, and increase in size and reflectance can be facilitated.

EXPLANATIONS OF LETTERS OR NUMERALS

Best Mode(s) for Carrying Out the Invention

Figure 1:
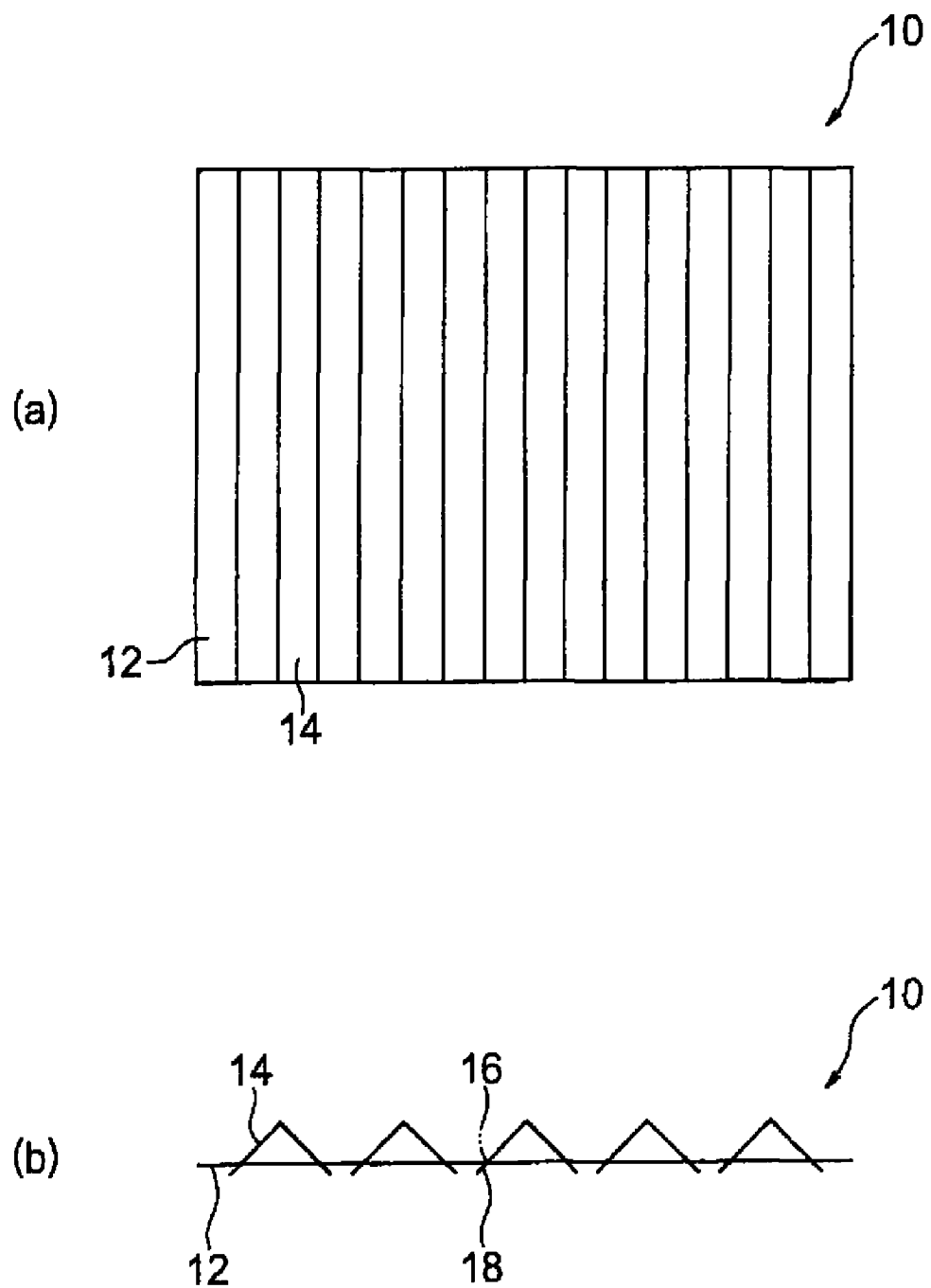
FIG. 1 (a) is a schematic planar view of a light reflection plate according to an embodiment of the present invention and (b) is a schematic front view of the same light reflection plate.

Next, embodiments of a light reflection plate of the present invention will be described with reference to the drawings. However, the present invention is not limited to the examples below. FIG. 1(a) is a schematic planar view of a light reflection plate according to an embodiment of the present invention. FIG. 1(b) is a schematic front view of the same light reflection plate.

A light reflection plate 10 of the present example includes a flat bottom plate 12 and a mountain plate 14. The bottom plate 12 is made from a foamed, thermoplastic polyethylene terephthalate sheet (MCPET [registered trademark] manufactured by Furukawa Electric Co., Ltd.) having an average air bubble diameter of 50 micrometers or less. The mountain plate 14 is made from the same foamed, thermoplastic polyethylene terephthalate sheet.

Figure 2:
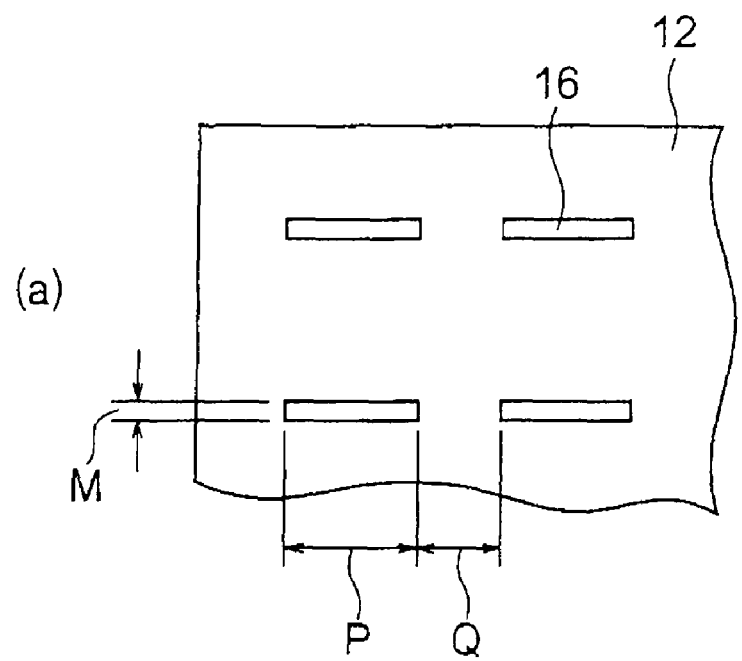
FIG. 2 (a) is an explanatory diagram of a bottom plate of the light reflection plate in FIG. 1 and (b) is an explanatory diagram of a mountain plate of the same light reflection plate.
Figure 2:
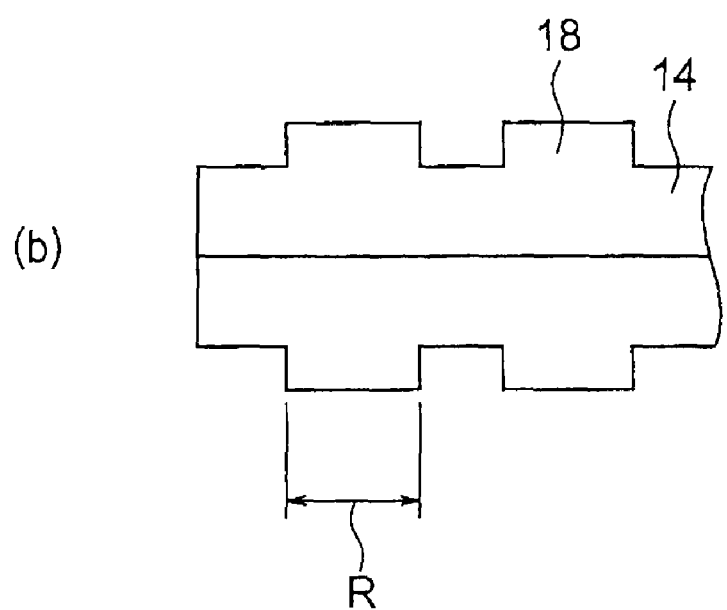

A plurality of mutually parallel rectangular slit holes 16 are formed in the bottom plate 12, as shown in FIG. 2(a). In this case, the plurality of mutually parallel slit-holes 16 are each intermittently formed along a straight line.

A width direction cross-sectional shape of the mountain plate 14 is a triangle, and a planar shape is a rough rectangle. The mountain plate 14 is formed by folding. As shown in FIG. 2(b), a plurality of rectangular insertion sections 18 corresponding to the slit holes 16 in the bottom plate 12 are intermittently formed in both width-direction end sections of the mountain plate 14.

In the light reflection plate 10 of the present example, the mountain plate 14 is fixed to the bottom plate 12 by each insertion section 18 of the mountain plate 14 being inserted into each slit hole 16 in the bottom plate 12. In this case, in the light reflection plate 10 of the present example, because the foamed, thermoplastic polyethylene terephthalate sheet having a restitutive force is used as a material for the mountain plate 14, when the insertion section 18 is inserted into the slit hole 16, an outer surface of the insertion section 18 comes into contact with an outer side surface of the slit hole 16 as a result of the mountain plate 14 expanding due to the restitutive force. Therefore, the mountain plate 14 is firmly fixed to the bottom plate 12.

Figure 3:
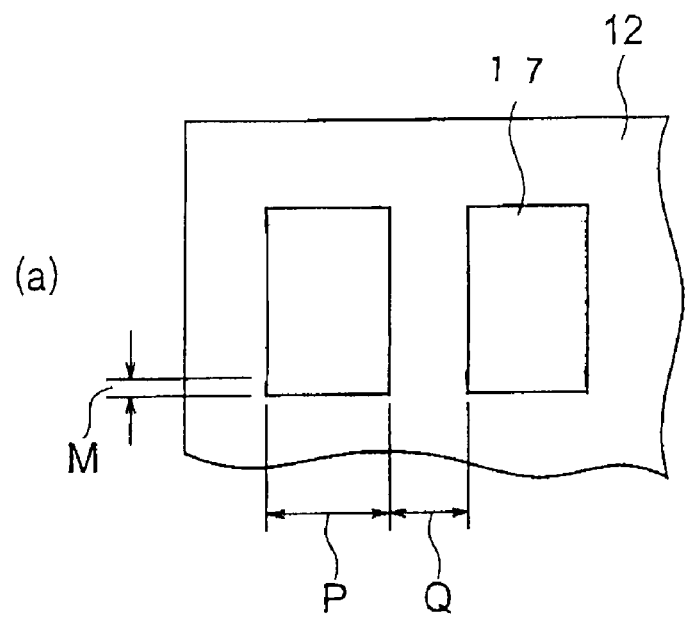
FIG. 3 (a) is an explanatory diagram of a bottom plate of another light reflection plate and (b) is an explanatory diagram of a mountain plate of the same light reflection plate.
Figure 3:
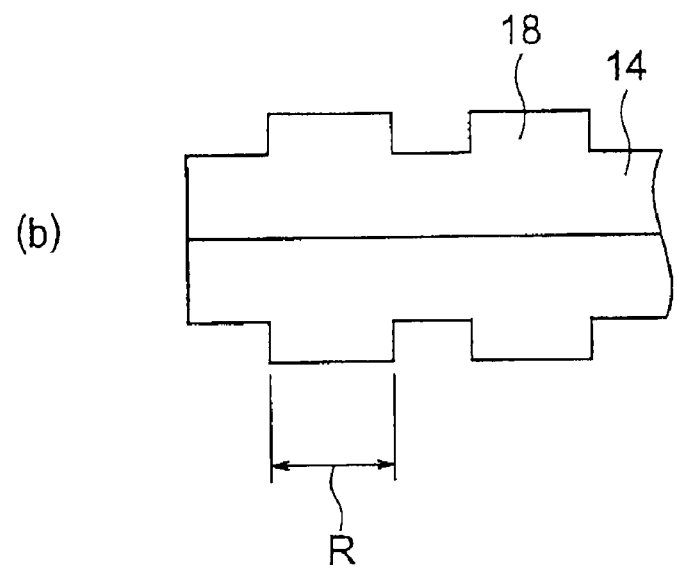

If the mountain plate 14 can be firmly fixed, each insertion section 18 can be inserted into a single, large slit hole 17 as shown in FIG. 3(a).

The light reflection plate 10 of the present example is used, for example, as a reflection plate for a backlight in a liquid crystal display device. In this case, a light source (not shown) is disposed between mountain plates 14.

To enhance mechanical strength of the bottom plate or the mountain plate, one or both of the bottom plate and the mountain plate can be formed by a laminated body including a light-reflective plastic film or sheet and a metal plate.

Figure 4:
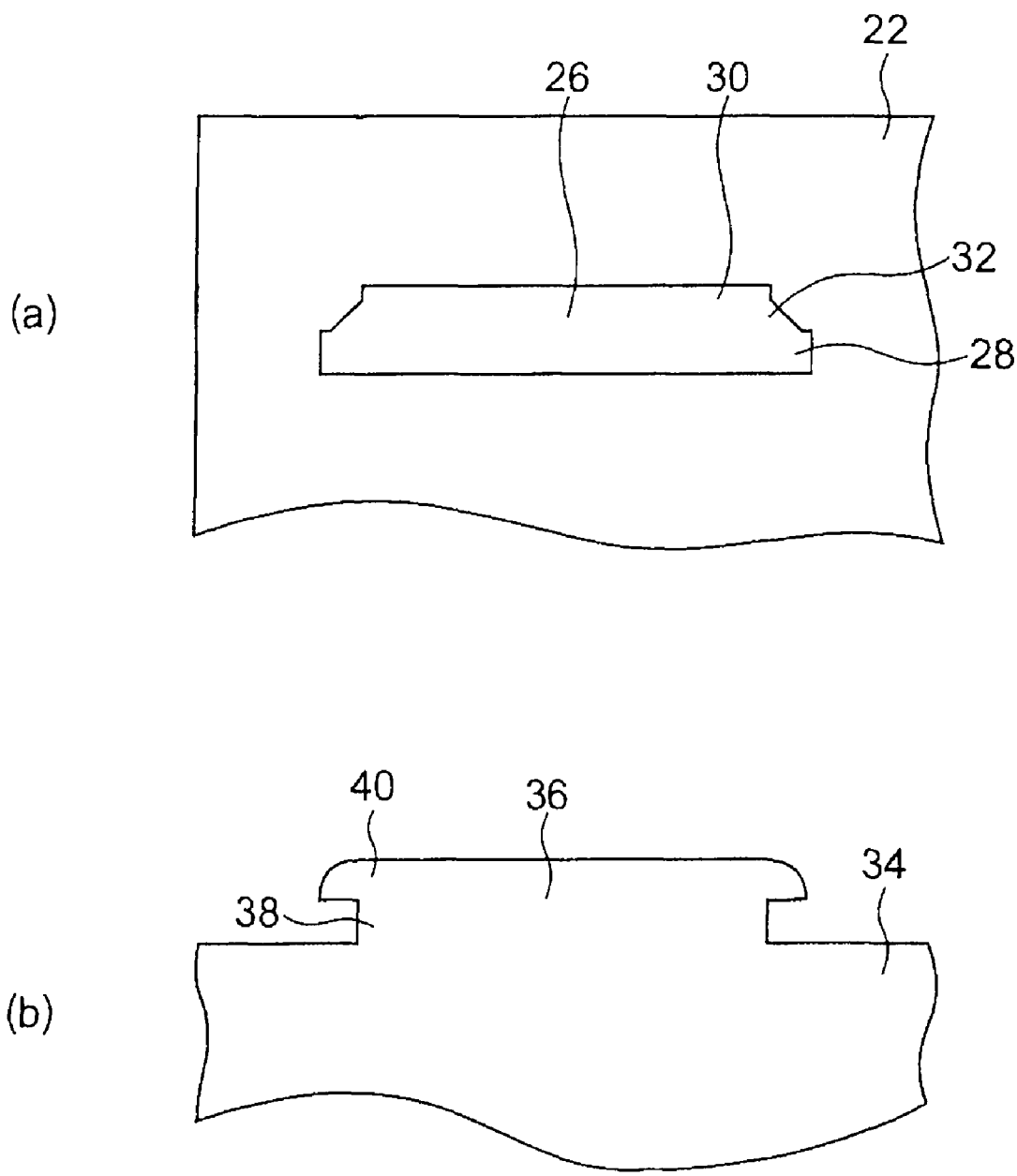
FIG. 4 (a) is an explanatory diagram of another example of the bottom plate and (b) is an explanatory diagram of another example of the mountain plate.

FIG. 4 shows another example of the bottom plate and mountain plate. A slit hole 26 in a bottom plate 22 of the present example has a wide section 28 on an inner side, a narrow section 30 on an outer side, and an intermediate section 32 between the wide section 28 and the narrow section 30 at which the width gradually narrows. An insertion section 36 of a mountain plate 34 of the present example has a narrow section 38 on a base end side and a wide section 40 on a tip end side. When the insertion section 36 is inserted into the wide section 28 of the slit hole 26, the narrow section 38 of the insertion section 36 passes through the intermediate section 32 and engages with the narrow section 30 of the slit hole 26, as a result of the mountain plate 34 expanding due to the restitutive force of the mountain plate 34. Therefore, the mountain plate 34 is firmly fixed to the bottom plate 22.

Figure 5:
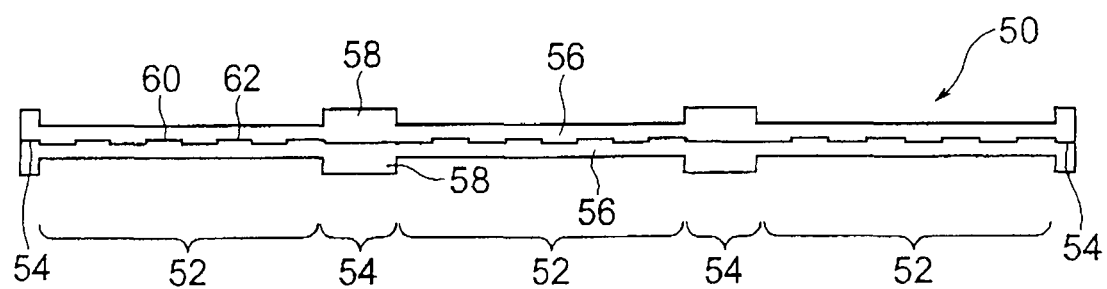
FIG. 5 is an extended planar view of another example of the mountain plate.

FIG. 5 is an extended planar view of another example of the mountain plate. In a mountain plate 50 of the present example, a concave-convex linear cut section and a joined section 54 are alternately formed at a peak section. In the cut section 52, a pair of angled plates 56 and 56 forming the mountain plate 50 are not connected. Therefore, the restitutive force of the mountain plate 50 is not generated. In the joined section 54, the pair of angled plates 56 and 56 are connected. Therefore, the restitutive force of the mountain plate 50 is generated. In the present example, the insertion section 58 is formed on each side of each joined section 54 at which the restitutive force is generated. The slit hole is formed in the bottom plate (not shown) only in sections corresponding to the insertion sections 58. An outer surface of the insertion section 58 comes into contact with the outer side surface of the slit hole as a result of the insertion section 58 being inserted into the slit hole in the bottom plate. The mountain plate 50 is firmly fixed to the bottom plate.

Figure 6:
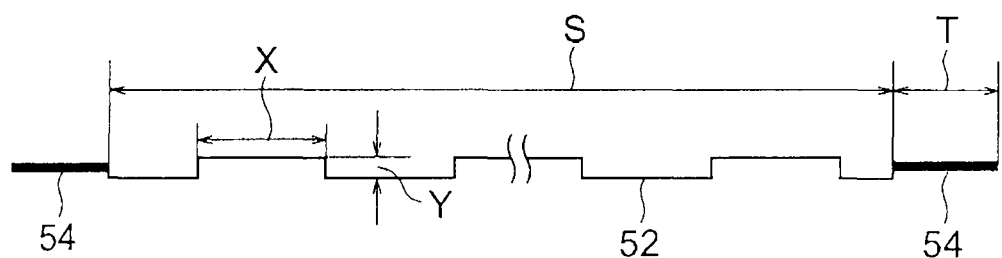
FIG. 6 is an explanatory diagram of dimensions of the mountain plate in FIG. 5.

In the present example, as shown in FIG. 6, a length S of a single cut section 52 is 150 to 200 millimeters. A length T of a single joined section 54 is 15 to 30 millimeters (however, lengths of the joined section 54 on both end sections of the mountain plate 50 are 3 to 10 millimeters). A ratio S:T of both lengths is 1:0.1 to 0.3. A length X of a single straight line portion of the cut section 52 can be set accordingly, based on a rigidity of a plate material forming the mountain plate 50. A length Y of a level difference in the cut section 52 is suitably about the same as a thickness of the plate material forming the mountain plate 50.

In the present example, a convex section 62 of one angled plate 56 enters a concave section 60 of another angled plate 56, and the concave and convex sections 60 and 62 engage with one another. As a result, when the light reflection plate is disposed vertically in a state in which a longitudinal direction of the mountain plate is horizontal, particularly in the liquid crystal display device, a space in the peak section of the mountain plate caused by gravitational force on the mountain plate can be effectively prevented from being formed. In addition, in the present example, compared to when a bending line is formed over an entire length of the peak section of the mountain plate, a number of slit holes in the bottom plate can be reduced by ¼ to ½.

The invention claimed is:

1. A light reflection plate comprising:
    a bottom plate in which slit holes are formed in a flat, light-reflective material; and
    a mountain plate made from a light-reflective plate material that is roughly rectangular from a planar view, of which a width direction cross-sectional shape is a mountain shape and in which insertion sections are formed on both width-direction end sections,
    wherein, the mountain plate is fixed to the bottom plate by the insertion sections of the mountain plate being inserted into the slit holes of the bottom plate.

2. The light reflection plate according to claim 1, wherein: the slit holes in the bottom plate are a plurality of mutually parallel slit holes formed in the flat, light-reflective plate material.

3. The light reflection plate according to claim 2, wherein: a slit hole in the bottom plate has a wide section on an inner side and a narrow section on an outer side, an insertion section of the mountain plate has a narrow section on a base end side and a wide section on a tip end side, and the narrow section of the insertion section of the mountain plate engages with the narrow section of the slit hole in the bottom plate when the insertion section of the mountain plate is inserted into the slit hole of the bottom plate.

4. The light reflection plate according to claim 2, wherein a slit width of the slit hole in the bottom plate is three times or less the thickness of the insertion section of the mountain plate.

5. The light reflection plate according to claim 1, wherein a plurality of slit holes are intermittently formed along a straight line, a length of a single slit hole is 50 millimeters or less, and a distance between two slit holes adjacent along the straight line is 30 millimeters or less.

6. The light reflection plate according to claim 1, wherein a concave-convex linear cut section and a joined section are alternately formed on a peak section of the mountain plate.

7. The light reflection plate according to claim 6, wherein a linear bending line is formed in the joined section.

8. The light reflection plate according to claim 6, wherein a length ratio of a single concave-convex linear cut section and a single joined section is 10 to 2:1.

9. The light reflection plate according to claim 1, wherein one or both of a plate material of the bottom plate and a plate material of the mountain plate is made from a light-reflective plastic film or sheet.

10. The light reflection plate according to claim 9, wherein the light-reflective plastic film or sheet is a thermoplastic film or sheet having fine bubbles or pores with a mean bubble diameter of 50 nanometers to 50 micrometers.

11. The light reflection plate according to claim 9, wherein the light-reflective plastic film or sheet is a thermoplastic film or sheet containing fillers in which numerous voids are formed with the fillers serving as cores.

12. The light reflection plate according to claim 1, wherein one or both of a plate material of the bottom plate and a plate material of the mountain plate is made from a laminated body including a light-reflective plastic film or sheet and a metal plate.

* * * * *